United States Patent
Matsunaga et al.

(10) Patent No.: US 7,951,736 B2
(45) Date of Patent: May 31, 2011

(54) SIC FIBER-BONDED CERAMIC AND PROCESS FOR PRODUCTION OF THE SAME

(75) Inventors: Kenji Matsunaga, Ube (JP); Shinji Kajii, Ube (JP); Toshihiko Hogami, Ube (JP)

(73) Assignee: Ube Industries, Ltd (JP)

( * ) Notice: Subject to any disclaimer, the term of this patent is extended or adjusted under 35 U.S.C. 154(b) by 156 days.

(21) Appl. No.: 12/440,882

(22) PCT Filed: Sep. 11, 2007

(86) PCT No.: PCT/JP2007/067659
§ 371 (c)(1),
(2), (4) Date: Mar. 11, 2009

(87) PCT Pub. No.: WO2008/035590
PCT Pub. Date: Mar. 27, 2008

(65) Prior Publication Data
US 2010/0041541 A1    Feb. 18, 2010

(30) Foreign Application Priority Data
Sep. 20, 2006 (JP) ................................. 2006-253987

(51) Int. Cl.
*C04B 35/52* (2006.01)
*C04B 35/00* (2006.01)
*B29C 47/76* (2006.01)
(52) U.S. Cl. ......... 501/88; 501/95.1; 501/95.2; 264/101
(58) Field of Classification Search .................. None
See application file for complete search history.

(56) References Cited

U.S. PATENT DOCUMENTS
2004/0029704 A1 * 2/2004 Kajii et al. ...................... 501/88

FOREIGN PATENT DOCUMENTS
| JP | 11-092227 | 4/1999 |
| JP | 2004-067480 | 3/2004 |
| JP | 2004-131365 | 4/2004 |
| JP | 2006-143553 | 6/2006 |

OTHER PUBLICATIONS

English translation of the International Preliminary Report on Patentability which issued in connection with corresponding International Application No. PCT/JP2007/067659.

* cited by examiner

*Primary Examiner* — D. Lawrence Tarazano
*Assistant Examiner* — Camie S Thompson
(74) *Attorney, Agent, or Firm* — Clark Hill PLC

(57) ABSTRACT

An SiC fiber bonded ceramic constituted of both a base material which comprises both inorganic fibers made mainly of a sintered SiC structure containing 0.01 to 1 wt % of oxygen (O) and at least one of Groups 2A, 3A and 3B metals and a 1 to 100-nm and carbon (C)-base boundary layer formed among the fibers and a surface part which is made mainly of an SiC-base ceramic structure and formed on at least part of the surface of the base material, characterized in that the boundary portion between the surface part and the base material takes such a gradient structure that the structure of the base material changes into the structure of the surface part gradually and continuously.

3 Claims, 2 Drawing Sheets (a) Tensile Test Piece (Both Ends-Notched Specimen)

(b) Tensile Test Piece (Smooth Specimen)

(a) Tensile Test Piece (Both Ends-Notched Specimen)

(b) Tensile Test Piece (Smooth Specimen)

SIC FIBER-BONDED CERAMIC AND PROCESS FOR PRODUCTION OF THE SAME

TECHNICAL FIELD

The present invention relates to an SiC fiber-bonded ceramic, which is dense, excellent in heat resistance and large in fracture resistance, and a process for production of the same. In particular, it relates to an SiC fiber-bonded ceramic applicable to abrasion resistance-required members, such as guide parts, bearing/sliding parts, roller parts and power-train parts.

BACKGROUND ART

Mechanical parts productive of interpart friction are required to exhibit improvements in abrasion resistance and fracture toughness though both properties can not be improved easily. For example, in steel parts, high carbon steel can be controlled through quenching to provide an improvement in abrasion resistance. In that case, though, the toughness of the total material is lowered. If the toughness is taken into account and thus less-carbon content steel is quenched and tempered, the abrasion resistance is deteriorated conversely. As a method for satisfying two requirements, that is, improvements in abrasion resistance and toughness, a method for surface hardening, such as carburizing and nitriding, has been known, which imparts abrasion resistance to a surface layer while holding toughness inside the material, thus hardens only the surface. This surface hardening method, however, has a problem because steel parts can not be used easily at a high temperature of 1000° C. or higher.

On the other hand, SiC and $Si_3N_4$ have both excellent abrasion resistance and high-temperature characteristic and accordingly have been developed progressively for the use as abrasion-resistive materials at high temperatures. These materials, however, have brittleness, which is the drawback inherent in monolithic ceramic, and are very sensitive to intrinsic small pores or cracks. Therefore, even if quality control is executed thoroughly to produce ceramic parts with no defect, minute defects such as microcracks in use caused greatly lower the material strength as a problem. For example, when ceramic parts are exposed to an environment with a sharp variation in temperature, a thermal expansion difference between the surface and the interior yields an internal stress, which causes microcracks in the surface and fractures these defect-sensitive ceramics. Therefore, it is required to replace the parts with new parts frequently before fracture of the parts.

A ceramic fiber-reinforced, ceramic matrix composite (hereinafter referred to as CMC) has a higher fracture resistance than the above monolithic ceramics. The higher fracture resistance is resulted from a sliding layer on the fiber surface, which is formed to prevent cracks from developing to adjacent fibers. In the CMC, however, the sliding layer has no abrasion resistance function and accordingly the fiber and the matrix fall out in accordance with abrasion of the sliding layer in the fiber surface as a problem. For the purpose of preventing this, a coating of ceramic material excellent in abrasion resistance is applied (Patent Document 1).

Patent Document 1: JP 2006-143553A

DISCLOSURE OF THE INVENTION

Problem to be Solved by the Invention

In the process of coating, however, it is required to adequately consider the adhesive strength and the reactions at high-temperatures between the CMC and the coating material. If the coated CMC part is exposed to a sharp variation in temperature, a thermal expansion difference between the coating layer and the CMC part may peel off the coating layer with high possibilities. An under coating for relieving the thermal expansion difference may be applied to prevent the peeling though it increases the steps of surface processing and complicates the entire process steps as a problem.

The present invention therefore has an object to provide an SiC fiber-bonded ceramic excellent in high-temperature characteristic and toughness and also excellent in abrasion resistance even without any surface coating, and a method of producing the same.

Means to Solve the Problem

To achieve the above object, the present invention provides an SiC fiber-bonded ceramic, comprising: a matrix, the matrix comprising inorganic fibers mainly having a sintered structure of SiC containing 0.01-1 wt. % of oxygen (O) and at least one metal atom of metal atoms in Groups 2A, 3A and 3B, and a 1-100 nm interfacial layer formed between the fibers and composed mainly of carbon (C); a surface portion having a ceramic structure composed mainly of SiC and formed on at least part of the surface of the matrix; and a boundary portion interposed between the surface portion and the matrix and having a graded structure that changes from the structure of the matrix to the structure of the surface portion gradually and continuously.

The SiC fiber-bonded ceramic according to the present invention includes a boundary portion, which is interposed between the surface portion excellent in abrasion resistance and the matrix excellent in high-temperature characteristic and toughness and has a graded structure that changes from the structure of the matrix to the structure of the surface portion gradually and continuously. Accordingly, the ceramic is excellent in high-temperature characteristic and toughness and also excellent in abrasion resistance even without any surface coating.

The present invention also provides a method of producing SiC fiber-bonded ceramic, comprising: a first step of adding a compound containing at least one metal element of metal elements in Groups 2A, 3A and 3B to polysilane having a proportion of 1.5 or higher in molar ratio of carbon atom to silicon atom, or a heated reactant thereof, followed by heating reaction in an inert gas to prepare a metal element-containing organosilicon polymer; a second step of melt spinning the metal element-containing organosilicon polymer to obtain spun fibers; a third step of heating the spun fibers in an oxygen-containing atmosphere at 50-170° C. to prepare cured fibers; and a fourth step of forming the cured fibers, or pyrolyzed fibers of the cured fibers pyrolyzed in an inert gas, into a certain-shaped preform, arranging the perform in a certain shaped carbon die such that at least part of the surface of the preform contacts an inorganic substance shaped at least one of powdery and porous, followed by heating the preform in an atmosphere composed of at least one of a vacuum, an inert gas, a reduction gas and a hydrocarbon at 1700-2200° C., and then pressurizing the preform with 100-1000 $kg/cm^2$.

Effect of the Invention

As described above, in accordance with the present invention, it is made possible to provide an SiC fiber-bonded ceramic excellent in high-temperature characteristic and toughness and also excellent in abrasion resistance even without any surface coating, and a method of producing the same.

THE BEST MODE FOR CARRYING OUT THE INVENTION

In the SiC fiber-bonded ceramic according to the present invention, the matrix comprises inorganic fibers mainly having a sintered structure of SiC containing 0.01-1 wt. % of oxygen (O) and at least one metal atom of metal atoms in Groups 2A, 3A and 3B, and a 1-100 nm interfacial layer formed between the fibers and composed mainly of carbon (C).

In the SiC fiber-bonded ceramic according to the present invention, the inorganic fibers contained in the matrix are inorganic fibers mainly having a sintered structure of SiC, which contain 0.01-1 wt. % of oxygen (O) and at least one metal atom of metal atoms in Groups 2A, 3A and 3B. The inorganic fibers having the sintered structure of SiC mainly comprise a polycrystalline sintered structure of β-SiC, or crystalline particulates of β-SiC and C. In a region where β-SiC crystal grains containing at least one of a microcrystal of C and an extremely small amount of oxygen (O) sinter together with no grain boundary second phase interposed therebetween, a strong bond between SiC crystals can be obtained. If fracture occurs in the fiber, it proceeds within a crystal grain of SiC in at least 30% or more of the region. Depending on the case, a intergranular fracture region between SiC crystals and a transgranular fracture region may be present in mixture.

The elements contained in the inorganic fibers are normally present in the proportion of Si: 55-70 wt. %, C: 30-45 wt. %, O: 0.01-1 wt. %, and M (a metal element in Groups 2A, 3A and 3B): 0.05-4.0 wt. %, preferably 0.1-2.0 wt. %. Those particularly preferable among the metal elements in Groups 2A, 3A and 3B are Be, Mg, Y, Ce, B, Al. These are all known as sintering aids for SiC and present in the form of chelate compounds and alxide compounds capable of reacting with an Si—H bond in an organosilicon polymer. If the proportion of the metal is excessively low, the fiber material can not obtain sufficient crystallinity. If the proportion is excessively high, the intergranular fracture increases, resulting in a reduction in mechanical properties.

Preferably, all or most of the inorganic fibers are deformed in the shape of polygons and bonded together in a structure extremely proximate to the closest packing. In a interfacial area between the fibers, a 1-100 nm interfacial layer mainly composed of carbon (C) is formed. The structure shown above provides an extremely higher mechanical properties of which strength at 1600° C. is 80% or more of the room temperature strength. The inorganic fibers are formed in an orientated state similar to the stacked state of sheets paralleled in uni-direction, an orientated state similar to the stacked state of three-dimensional fabrics, an orientated state similar to the state of three-dimensional fabrics or a random orientated state, or a mixed-structure thereof. These are selected for a while in accordance with the mechanical properties required for the target shape.

The ceramic-structured surface portion mainly composed of SiC in the SiC fiber-bonded ceramic according to the present invention has a monolithic ceramic structure mainly comprising the sintered structure of SiC and contains 0.01-1 wt. % of oxygen (O) and at least one metal atom of metal atoms in Groups 2A, 3A and 3B.

SiC in the surface portion mainly comprises a polycrystalline sintered structure of β-SiC, or crystalline particulates of β-SiC and C. In a region where β-SiC crystal grains containing at least one of a microcrystal of carbon (C) and an extremely small amount of oxygen (O) sinter together with no grain boundary second phase interposed therebetween, a strong bond between SiC crystals can be obtained. If fracture occurs, it proceeds within a crystal grain of SiC in at least 30% or more of the region. Depending on the case, a intergranular fracture region between SiC crystals and a transgranular fracture region may be present in mixture.

The SiC fiber-bonded ceramic according to the present invention comprises a surface portion having a ceramic structure composed mainly of SiC, and a matrix structured of the closest packing by inorganic fibers deformed in the shape of polygons. In addition, it includes a graded structural portion that changes from the structure of the matrix to the structure of the surface portion gradually and continuously. The graded structural portion is referred to as a boundary portion. Boundaries between the matrix, the boundary portion and the surface portion are not clear and configured such that the interfacial layer composed mainly of carbon between inorganic fibers can be identified gradually from the surface portion toward the matrix.

The SiC fiber-bonded ceramic according to the present invention can be produced through the following first through fourth steps.

First Step

The first step is provided to prepare a prepolymer or a metal-containing organosilicon polymer. Polysilane used in the first step is a chain or cyclic polymer, which can be obtained through dechlorination reaction of one or more dichlorosilanes using sodium in accordance with the method described in "Chemistry of Organosilicon Compounds", Kagaku-Dojin (1972). The polymer usually has a number average molecular weight of 300-1000. Polysilane may have a hydrogen atom, a lower alkyl group, a phenyl group or a silyl group as a side chain of silicon. In any case, the proportion of carbon atom to silicon atom is required to have a value of 1.5 or higher in molar ratio. If this condition is not satisfied, all of carbon in the fiber is eliminated as a carbon dioxide together with oxygen induced on curing during the stage of temperature elevation before sintering. This is not preferable because a interfacial carbon layer can not be formed between the fibers.

As polysilane for use in the first step, a heated reactant thereof may be used. The heated reactant of polysilane involves a polysilane bond unit obtained by heating the above chain or cyclic polysilane, and an organosilicon polymer containing a carbosilane bond in part. Such the organosilicon polymer can be prepared in accordance with a publicly known method. Examples of the preparation include a method comprising subjecting a chain or cyclic polysilane to heating reaction at a relatively high temperature of 400-700° C., and a method comprising adding a phenyl group-containing polyborosiloxane to the polysilane obtained by the above method, followed by heating reaction at a relatively low temperature of 250-500° C. The organosilicon polymer thus obtained usually has a number average molecular weight of 1000-5000.

The phenyl-containing polyborosiloxane can be prepared in accordance with the methods described in JP 53-42300A and JP 53-50299A. For example, a phenyl-containing polyborosiloxane can be prepared through a dehydrochlorination condensation reaction of a boric acid with one or more diorganochlorosilanes. It usually has a number average molecular weight of 500-10000. The amount of the phenyl-containing polyborosiloxane added is usually 15 parts by weight or below on the basis of 100 parts by weight of polysilane.

A certain amount of a compound containing a metal element in Groups 2A, 3A and 3B is added to polysilane, followed by reaction in an inert gas usually at a temperature of 250-350° C. for 1-10 hours, thereby preparing the material or the metal element-containing organosilicon polymer. The metal element is used in a proportion such that the proportion of the metal element contained in the finally produced, sintered SiC fiber-bonded body falls within 0.05-4.0 wt. %. A specific proportion can be determined appropriately by the ordinary person in the art in accordance with the teaching of the present invention. The metal element-containing organosilicon polymer is a bridged polymer having a structure in which at least part of silicon atoms in polysilane is bonded to the metal atom via or not via an oxygen atom.

Available examples of the compound containing a metal element in Groups 2A, 3A and 3B added in the first step include alcoxides, acetylacetoxide compounds, carbonyl compounds and cyclopentadienyl compounds of the metal element, for example, beryllium acetylacetonato, magnesium acetylacetonato, yttrium acetylacetonato, cerium acetylacetonato, boric butoxide, and aluminum acetylacetonato. These are all capable of reacting with an Si—H bond in an organosilicon polymer produced on reaction with polysilane or a heated reactant thereof, thereby producing a structure in which metal elements bond to Si directly or via other elements.

Second Step

The second step is provided to obtain spun fibers of the metal element-containing organosilicon polymer. The prepolymer or the metal element-containing organosilicon polymer is spun through a publicly known method, such as melt spinning or dry spinning, to obtain the spun fibers.

Third Step

The third step is provided to heat the spun fibers in an oxygen-containing atmosphere at 50-170° C. to prepare cured fibers. The purpose of curing is to form a bridge point by an oxygen atom between polymers contained in the fibers to prevent the cured fibers from melting and adjacent fibers from adhering to each other at the following pyrolyzing step. As the gas contained in the oxygen-containing atmosphere, the curing time depends on the curing temperature and usually extends from several minutes to 30 hours. Desirably, the cured fiber is controlled to contain 8-16 wt. % oxygen. Most of oxygen remains in the fiber even after the next step of pyrolysis to play an important role in eliminating extra carbon in the inorganic fiber as a CO gas during the stage of temperature elevation before final sintering. If the content of oxygen is less than 8 wt. %, extra carbon in the inorganic fiber remains more than required, segregates with stability around SiC crystals during the stage of temperature elevation, and therefore inhibits β-SiC crystals from sintering together with no grain boundary second phase interposed therebetween. If it is more than 16 wt. %, extra carbon in the inorganic fiber can be eliminated completely and no interfacial carbon layer is produced between the fibers. Any one of these exerts an ill effect on the mechanical properties of the resultant material.

Preferably, the cured fiber is further preheated in an inert gas atmosphere. Examples of the gas contained in the inert gas atmosphere may include nitrogen and argon. The heating temperature is usually 150-800° C. and the heating time extends from several minutes to 20 hours. Preheating the cured fiber in the inert gas atmosphere prevents oxygen from being taken into the fiber, and further develops the bridging reaction of the polymer contained in the fiber. It also retains excellent extension of the cured fiber from the prepolymer, and further improves the strength, thereby executing the next step of pyrolysis with workability and stability.

Fourth Step

In the fourth step, it is possible to use the cured fiber obtained in the third step, or use the pyrolyzed fiber, which is obtained by heating the cured fiber in a continuous system or a batch system for pyrolysis in an inert gas atmosphere such as argon at a temperature of 1000-1700° C.

The cured fibers obtained at the third step or the pyrolyzed fibers resulted through pyrolysis of the cured fibers are formed in a preform in a certain shape, for example, at least one of shapes of fabrics, sheets made of fibers oriented in unidirection, fiber bundles, and chopped short fibers. The preform is then arranged in a certain shaped carbon die such that at least part of the surface of the preform adjoins an inorganic substance shaped at least one of powdery and porous, and the preform is heated in an atomsphere composed of at least one of vacuum, an inert gas, a reduction gas and a hydrocarbon at 1700-2200° C. After heating, the preform is pressurized under pressure of 100-1000 kg/cm² to produce the SiC fiber-bonded ceramic according to the present invention. Preferably, to exclude carbon as CO and SiO gases from the surface portion of the preform after heating, the preform is held at that temperature for a certain period of time and then pressurized. The holding time may be determined in accordance with the size and type of the preform, the temperature elevation rate and so forth.

The powdery or porous inorganic substance is not limited particularly if it exerts no effect on the part performance after molding though major examples thereof may include carbon and BN. The shape and size of the inorganic substance are appropriately selected in accordance with the part shape and the state of the SiC ceramic formed in the target surface. For example, if it is intended to make deeper the surface SiC ceramic-formed layer, a powder having a larger average particle diameter is selected. The portion where the preform contacts the inorganic substance becomes the surface portion composed mainly of the SiC ceramic and, from the surface portion toward the interior, a boundary portion having a graded structure varying with a gradient is formed in the structure of the matrix.

EXAMPLES

The following description is given to Examples of the SiC fiber-bonded ceramic according to the present invention. In general, an increase in hardness is effective in improving the abrasion resistance as has been made obvious. This is shown, for example, in "Thin Film Handbook" (Ohm Inc., published in 1983, p. 865) and in "Soft Plating, Hard Plating" (Technology Research Institute of Osaka Prefecture, Surface Chemical Group, Morikwawa Tsutomu, 1998, http://tri-osaka.jp/group/kikaikinzoku/hyoumen/surface/morikawa/R2/P2.html, FIG. 2). Also in the present example, hardness measurements were performed to evaluate the abrasion resistance in accordance with the variation in hardness. In addition, for evaluation of the toughness inside the SiC fiber-bonded ceramic according to the present example, the surface layer was removed and the tensile strength was measured on a notched specimen and a smooth specimen in the portion composed of the SiC fiber and the carbon layer formed on the surface thereof. The tensile strength of the notched specimen from the SiC fiber-bonded ceramic is hardly susceptible to the stress concentration due to the notch and accordingly follows the net sectional stress standard as can be found. In other words, the tensile strength of the notched specimen is almost equal to the tensile strength of the smooth specimen having the same cross-sectional area as the net cross-sectional area excluding the notch. In summary, if the toughness inside the SiC fiber-bonded ceramic according to the present example is equal to an SiC fiber-bonded body having no ceramic-structured surface portion, and the hardness is higher in the surface than in the interior, the abrasion resistance of the SiC fiber-bonded ceramic according to the present example can be improved. Methods for testing hardness and tension are shown below.

[Hardness Test]

A Vickers hardness tester (MODEL MV-1 available from MATSUZAWA SEIKI) was used for testing under the conditions with a load weight of 9.8 N, a load time of 20 sec and a loading rate of 40 μm/sec to measure lengths of two diagonal lines of a indentation. The hardness (unit: Hv) was calculated in accordance with the following expression 1.

[Expression 1]

$$Hv = 0.1891 \, (F/d^2) \qquad (1)$$

where F indicates a load weight (N), and d indicates an average (mm) of two diagonal lines of a indentation.

[Tensile Test]

The tensile tests for the notched specimen and the smooth specimen were performed as follows. The tensile test pieces of the notched specimen and the smooth specimen were as shown in FIG. 1. The tests were performed at a crosshead rate of 0.5 mm/min using a Tensilon universal tester (RTC-1310A available from Orientec Inc.). The real fracture strength of the notched specimen was derived from the fracture load divided by the cross-sectional area (10 mm width×2 mm thickness). The fracture strength of the smooth specimen was also derived from the fracture load divided by the cross-sectional area (10 mm width×2 mm thickness) similar to the notched specimen.

Next, the SiC fiber-bonded ceramic according to the present example was produced as follows. First, 1 L of a dimethyldichlorosilane was dropped into an anhydrous xylene containing 400 g of sodium while heating and refluxing xylene under nitrogen gas current, followed by heating and refluxing for 10 hours to yield a precipitate. This precipitate was filtered and washed with methanol and then with water to obtain 420 g of white polydimethylsilane.

Then, 750 g of diphenyldichlorosilane and 124 g of boric acid were heated under a nitrogen gas atmosphere in n-butyl ether at 100-120° C. and the resultant white resinous product was heated in vacuum at 400° C. for 1 hour to obtain 530 g of a phenyl group-containing polyborosiloxane.

4 parts of the phenyl group-containing polyborosiloxane were added to 100 parts of the resultant polydimethylsilane and thermally condensed in a nitrogen gas atmosphere at 350° C. for 5 hours to obtain an organosilicon polymer having a high molecular weight. Into a solution of 100 parts of the organosilicon polymer dissolved in xylene, 7 parts of aluminum tri-(sec-butoxide) were added, followed by crosslinking reaction under nitrogen gas current at 310° C. to obtain polyaluminocarbosilane. This is melt spun at 245° C., then heated in air at 140° C. for 5 hours, and finally heated in nitrogen at 300° C. for 10 hours to obtain cured fibers. The cured fibers were continuously fired in nitrogen at 1500° C. to synthesize silicon carbide-based continuous inorganic fibers. Next, a satin fabric sheet of the inorganic fibers was formed and then cut into pieces of 89 mm×89 mm, of which 150 pieces were stacked and set in a carbon die of 90 mm×90 mm. Then, 200 g of carbon powder were fed onto the stacked fabric and, under an argon atmosphere, the temperature was elevated up to 1900° C. in 4 hours. The temperature was held for 30 minutes, followed by hot press molding under pressure of 50 MPa to obtain the SiC fiber-bonded ceramic according to the present example.

The cross section of the SiC fiber-bonded ceramic according to the present example was observed with an optical microscope. A typical photo is shown in FIG. 2. The near-surface portion on the side adjacent to the carbon powder mainly has an SiC sintered structure (ceramic structure), which exhibits no fiber form obviously. On the other hand, it was confirmed that, from the interior to the opposite side, a carbon layer (interfacial layer) was formed on the surface of the SiC fiber having a polycrystalline sintered structure. In addition, there is no obvious boundary from the ceramic-structured surface portion to the interior and confirmed a boundary portion having a graded structure that changes gradually and continuously to the structure of the matrix composed of inorganic fibers and the interfacial layer. As a comparison, FIG. 3 shows an SiC fiber-bonded body having no ceramic-structured surface portion.

Hardness of the near-surface portion and that of the interior were measured. In order to evaluate the toughness of the interior, the surface layer was removed, and the tensile strength was measured for the notched specimen from the structured portion including the carbon layer formed on the surface of the SiC fiber having the sintered structure. The average hardness of the near-surface portion (430 Hv) was obviously improved higher than the average hardness of the interior (280 Hv). This suggests that the abrasion resistance of the near-surface portion was improved better than that of the interior. The tensile strengths of the smooth specimen and the notched specimen were 205 MPa and 160 MPa on average, respectively. If the strength of the notched specimen is not susceptible to the stress concentration on the notch tip but follows the net sectional standard, it can be represented by the following expression 2 where $\sigma_f$ indicates the tensile strength (205 MPa) of the smooth specimen; a indicates the one-side notch length, (1 mm); and W indicates the test piece width (10 mm). From the expression 2, the fracture strength of the notched specimen is 164 MPa. The actually measured fracture strength of the notched specimen is 160 MPa, which is almost equal to the value derived from the expression 2. Thus, the interior of the SiC fiber-bonded ceramic according to the present example is found not lowered in strength by the stress concentration due to the notch and so forth but excellent in toughness.

[Expression 2]

$$\sigma_g = \sigma_f (1-\alpha) \quad \alpha = 2a/W \qquad (2)$$

Figure 1:
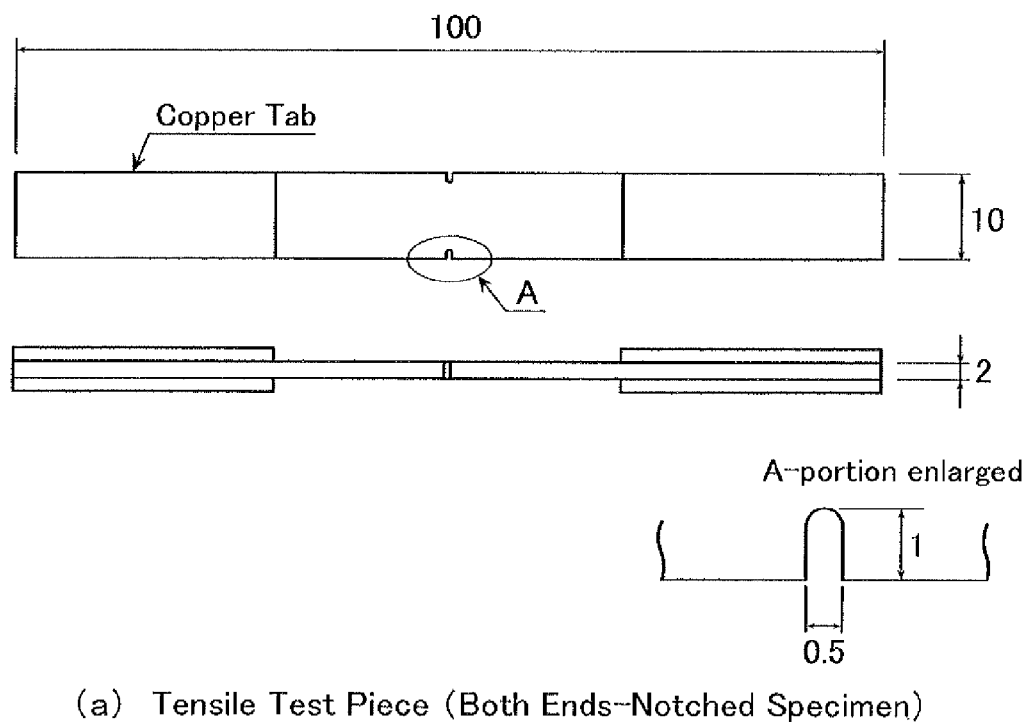
FIG. 1 shows shapes and sizes of tensile test pieces of a notched specimen (a) and a smooth specimen (b) for use in evaluation of toughness inside the SiC fiber-bonded ceramic according to the example.
Figure 1:
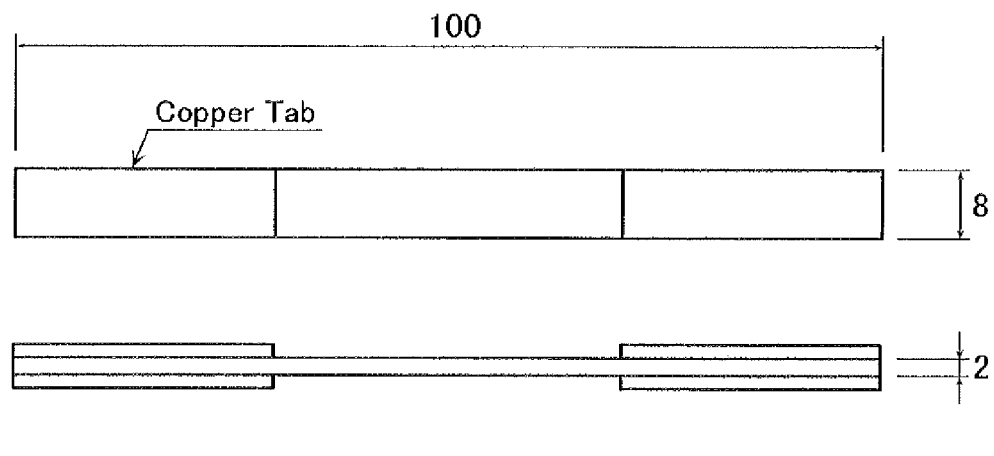
Figure 2:
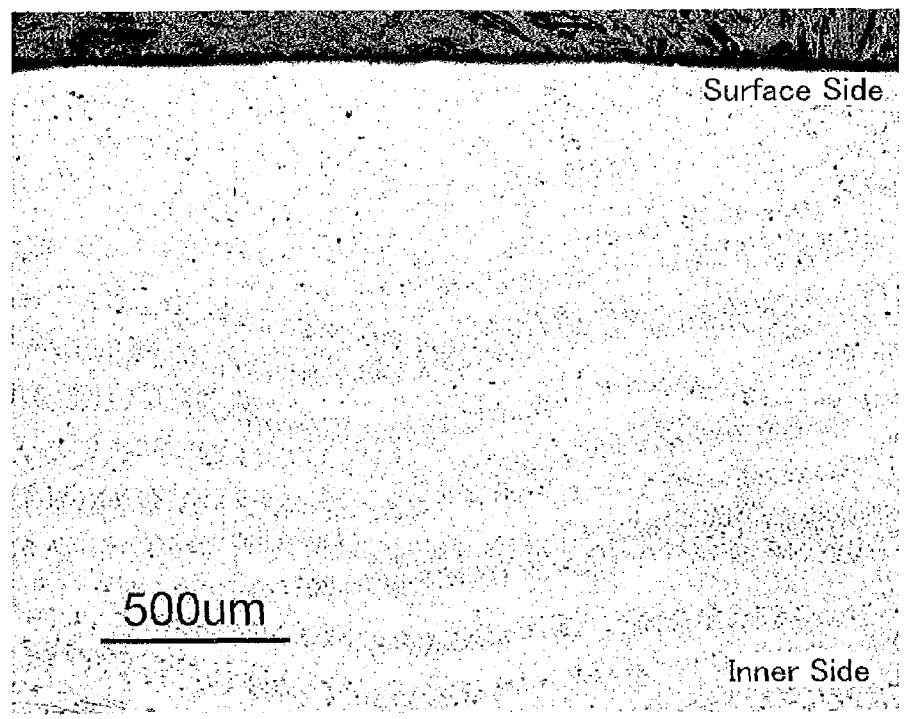
FIG. 2 is a photo of the cross section of the SiC fiber-bonded ceramic according to the example taken by an optical microscope.
Figure 3:
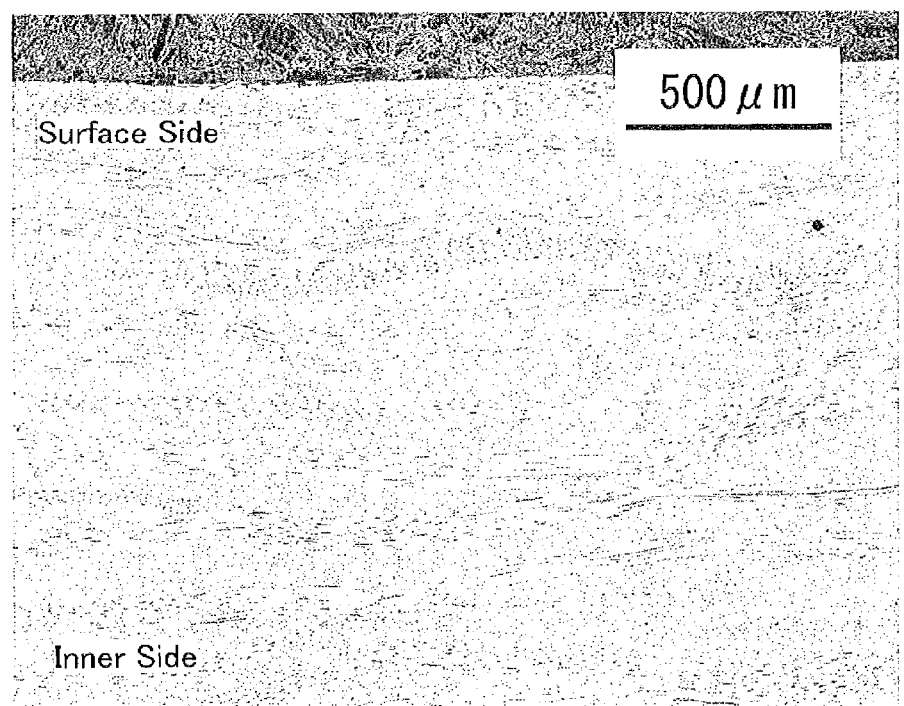
FIG. 3 is a photo of an SiC fiber-bonded body having no ceramic-structured surface portion taken by an optical microscope.

The invention claimed is:

1. An SiC fiber-bonded ceramic, comprising:
   a matrix, the matrix comprising inorganic fibers mainly having a sintered structure of SiC containing 0.01-1 wt. % of oxygen (O) and at least one metal atom of metal atoms in Groups 2A, 3A and 3B, and a 1-100 nm interfacial layer formed between the fibers and composed mainly of carbon (C);

a surface portion having a ceramic structure composed mainly of SiC and formed on at least part of the surface of the matrix; and a boundary portion interposed between the surface portion and the matrix and having a graded structure that changes from the structure of the matrix to the structure of the surface portion gradually and continuously.

2. A method of producing SiC fiber-bonded ceramic according to claim 1, comprising:

a first step for adding a compound containing at least one metal element of metal elements in Groups 2A, 3A and 3B to polysilane having a proportion of 1.5 or higher in molar ratio of carbon atom to silicon atom, or a heated reactant thereof, followed by heating reaction in an inert gas to prepare a metal element-containing organosilicon polymer;

a second step of melt spinning the metal element-containing organosilicon polymer to obtain spun fibers;

a third step of heating the spun fibers in an oxygen-containing atmosphere at 50-170° C. to prepare cured fibers; and a fourth step of forming the cured fibers, or pyrolyzed fibers of the cured fibers pyrolyzed in an inert gas, into a certain-shaped preform, arranging the preform in a certain shaped carbon die such that at least part of the surface of the preform contacts an inorganic substance shaped at least one of powdery and porous, followed by heating the preform in an atmosphere composed of at least one of a vacuum, an inert gas, a reduction gas and a hydrocarbon at 1700-2200° C., and then pressurizing the preform with 100-1000 kg/cm$^2$.

3. The process for production of SiC fiber-bonded ceramic according to claim 2, wherein the fourth step includes holding the preform at the heating temperature for a certain period of time, and then pressurizing the preform.

* * * * *